Feb. 20, 1968  A. A. PUCCINELLI ET AL  3,369,564

TRANSFER VALVE

Filed Dec. 16, 1964  2 Sheets-Sheet 1

INVENTORS
ALBERT A. PUCCINELLI
JOSEPH R. SMITH, JR.

BY
ATTORNEYS

3,369,564
TRANSFER VALVE

Albert A. Puccinelli, San Jose, and Joseph R. Smith, Jr., Milpitas, Calif., assignors to the United States of America as represented by the Administrator of the National Aeronautics and Space Administration
Filed Dec. 16, 1964, Ser. No. 420,250
1 Claim. (Cl. 137—625.5)

ABSTRACT OF THE DISCLOSURE

A three-port transfer valve having one continuously open main port with the fluid flow to the main port being selectively transferable from one to the other of the remaining two ports which are positioned in opposed coaxial relationship. A hollow valve member, guided for linear movement between these two opposed valves, has a cam surface formed on the inside wall thereof. A cam driver is rotatably supported in engagement with the cam surface so that when the cam driver is rotated it will force the valve member toward either of the two opposed ports, thereby closing one and opening the other. When in this position, the valve member is locked by the cam driver against movement in response to fluid pressure in the closed port. The cam driver is driven by remote control, with little or no power being required to hold the valve member in the locked position, even when subjected to substantial acceleration forces.

---

The invention described herein may be manufactured and used by or for the Government of the United States of America for governmental purposes without the payment of any royalties thereon or therefor.

This invention relates to valves and more particularly to three-port valves having a valve member for controlling two of the ports so that when one of the two ports is closed the other is open. More specifically the invention relates to a three-port transfer valve which is so named because it has one continuously open main port, and the fluid flow through the valve to the main port is selectively transferred from one to the other of the two controlled valve ports.

The particular environment for which the valve of the present invention was developed is in the field of space travel. The valves are used both in test apparatus and in actual flight conditions. The test apparatus, which does not form any part of this invention, is designed to determine the effects of vehicle acceleration on the pilot's ability to perform control tasks under simulated flight conditions. In both the simulated and actual flight apparatus the gas transfer valve is employed to switch the flow of gases, for example, air and oxygen, to the various parts of the respiratory system.

The objectives which are met by the present invention are as follows. In most instances the valves must be capable of remote control. The valves must be fail safe; that is, if there is a failure in the mechanism for operating the valve, one or both of the two controlled ports will always be open so that the pilot's air supply will never be cut off. Since both the test and actual flight conditions involve substantial acceleration forces, it is necessary that the transfer valve be able to withstand such forces without any detrimental effect. For example, a valve made in accordance with the invention has been tested up to 20 g acceleration force in all directions while still holding off a pressure differential of five pounds per square inch. It is important that the valve not offer high resistance to breathing and that it be capable of changing porting rapidly. It is also important that the valve be quick acting, and that it require little or no power to hold the port controlling member in port-closing position.

It is an object of the present invention to provide an improved transfer valve which achieves all the objectives described in the preceding paragraph.

Another object of the invention is to provide a valve having an improved operating mechanism.

By way of brief description a specific valve made in accordance with the invention comprises a casing forming an internal chamber. The casing is provided with three ports in communication with the chamber, and two of the ports are positioned opposite each other. A valve member is located between the opposite ports, and support means guide the valve member for linear movement between the opposite ports. Closure members are provided on opposite sides of the valve member so that when the valve member is moved toward one of the two opposite ports, the closure member will close the port toward which it is moved. The center portion of the valve member is hollow with the inside wall thereof formed in the shape of a cam surface. A cam driver is rotatably supported in engagement with the cam surface so that when the cam driver is rotated it will force the valve member toward either of the two opposite ports thereby closing one and opening the other. The third port of the valve is always open and the flow to the main open port is transferred by the valve from one to the other of said two opposite ports.

The various objects and features of advantage of the invention will be more apparent from the following detailed description wherein reference is made to the accompanying drawings in which.

Figure 1:
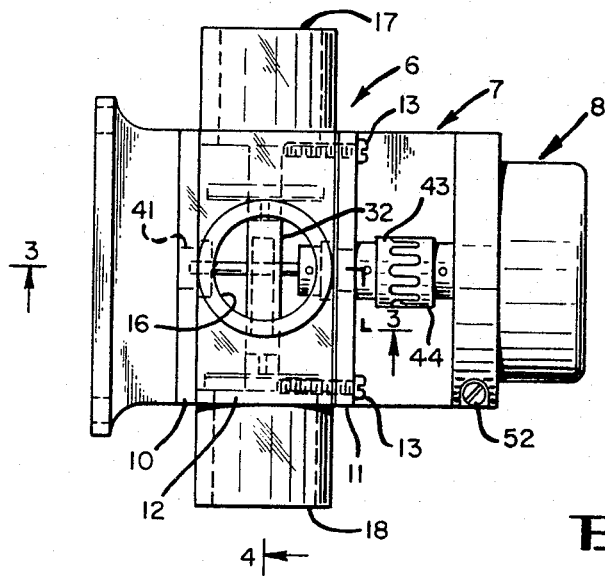
FIGURE 1 is a top view of a transfer valve according to the invention.
Figure 2:
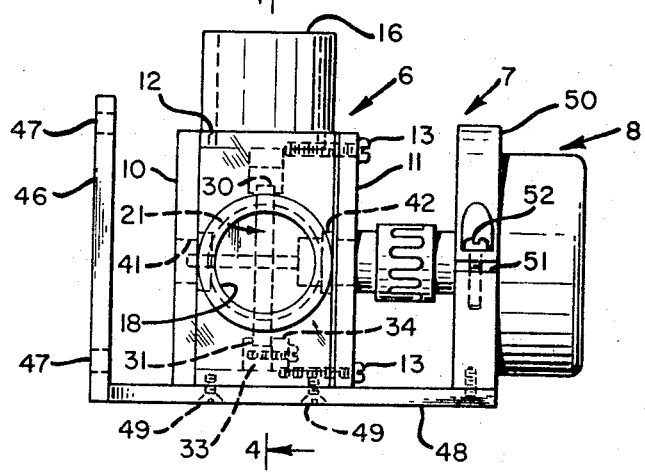
FIGURE 2 is a side view of the valve.
Figure 3:
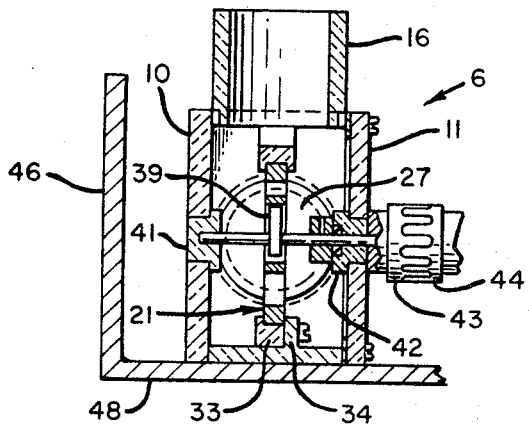
FIGURE 3 is a cross sectional view through the valve taken on line 3—3 of FIGURE 1.

Referring in more detail to the drawings the valve comprises a casing 6 mounted on a U-shaped support frame 7 and operated by an electrical rotary solenoid or motor 8. The casing 6 is preferably made of a transparent plastic material such as "Lucite" so that any foreign matter can be easily observed.

In one convenient construction the casing 6 is made with two flat end plates 10 and 11 and an intermediate hollow four sided frame 12. Plate 10 is permanently bonded to the frame 12 and plate 11 is removably attached by screws 13 to provide for assembly of the internal parts of the valve. The assembled parts 10, 11 and 12 form an internal valve chamber 14. Three short tubes are attached to three sides of the frame 12 to provide a constantly open main port 16 and two coaxial ports 17 and 18 disposed opposite each other.

A valve member 21 is positioned in chamber 14 to control the ports 17 and 18 so that when one port is closed the other is open. In a preferred embodiment the valve member 21 is made of metal. The valve member 21 carries a resilient circular closure member 22 on one side and a similar closure member 23 on the other side, each closure member being preferably made of silicon rubber. In order to keep the weight down the closure elements 22 and 23 are attached to the valve member by small metal pins 24 and 25 which carry thin metal backing disks 26 and 27. Closure member 22 abuts a seat 28 to close port 18, and closure member 23 abuts a seat 29 to close port 17.

Valve member 21 is guided for linear movement between the opposite ports 17 and 18 by means of upper and lower guide slots 30 and 31, respectively. Slot 30 is formed in a plastic member 32 which is permanently bonded to the top and side walls of the intermediate frame 12. In order to be able to install the guide member 21 in the guide slots, the lower slot 31 is formed by a two piece construction. More specifically the slot 31 is formed by a first member 34 which is permanently bonded to the bottom and side walls of the intermediate frame 12 and by a removable second member 33 which is attached to the member 34 by screws 35.

The valve member 21 is hollowed out to form a cam surface having side portions 36 and 37 adjacent the ports 18 and 17, respectively. The side cam portions are interconnected by an intermediate connecting portion 38. It will be noted that the valve member 21 is hollowed out intermediate the cam-forming section and the edges received in the guide slots in order to reduce the weight. A cam driver 39 is positioned in the valve member for engagement with the cam surfaces 36–38.

The cam driver 39 is mounted on a shaft 40 for rotation therewith. One end of the shaft is journalled in a plastic bearing plug 41 in the wall 10. The other end of shaft 40 is rotatably received in a plastic bearing plug 42, and carries a connecting member 43 having teeth which inter-engage with teeth on a connecting member 44 which is attached to the rotary drive shaft from the electrical drive mechanism 8.

The U-shaped support frame 7 comprises an upright leg 46 which is provided with holes 47 for mounting the unit on associated apparatus. The valve casing 6 is mounted on the base 48 of the U-shaped member by means of screws 49. The second upright leg 50 of the support member is arranged to carry the electric drive mechanism 8. More specifically the upright leg 50 is provided with a circular bore to engage the circular casing of the drive mechanism 8. The peripheral wall of the circular bore is cut at 51 so that a holding screw 52 can lock the drive mechanism 8 in place.

Figure 4:
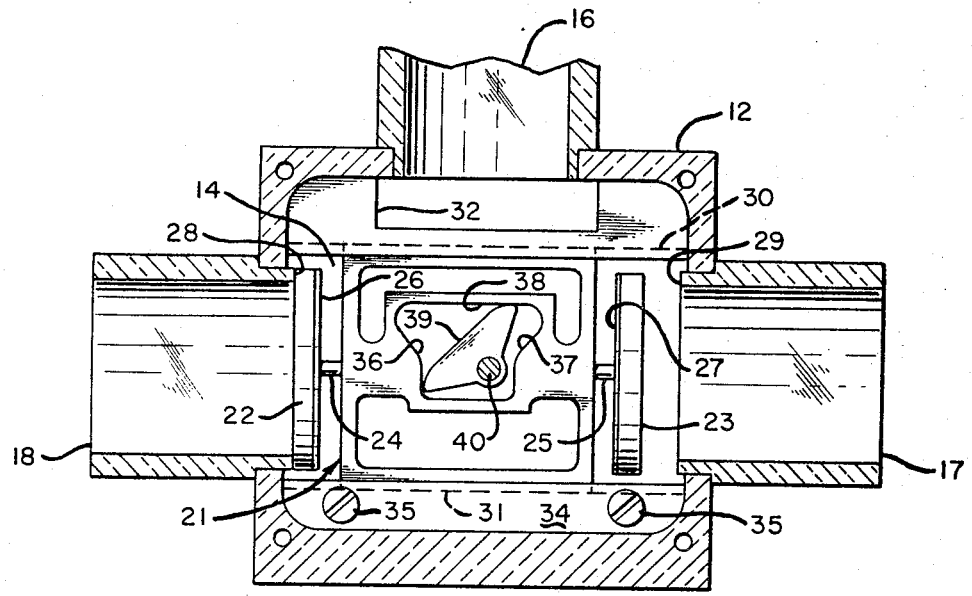
FIGURE 4 is a cross sectional view on an enlarged scale taken on the line 4—4 of FIGURE 2 and showing one of the two opposite ports closed.

The electric drive mechanism 8 can be any conventional type of rotary drive arrangement. For example, the drive mechanism can be a rotary solenoid which is electro-magnetically driven to rotate in one direction and is spring driven to rotate in the opposite direction. Alternatively the drive mechanism can be a conventional rotary solenoid which is electro-magnetically driven to rotate in both directions, or a conventional reversible motor may be used in some applications. In any event the cam arrangement is such that little or no power is required to maintain the valve in closed position. Thus, in order to conserve power the drive mechanism 8 and associated circuitry can be arranged so that the power is cut off or substantially reduced after the cam 39 has been turned to close either of ports 17 and 18. In other words, power from the electric drive mechanism is required to move the valve member 21 into closed position but is not required to hold it in such position. The way in which the self locking feature is obtained is as follows: Referring to FIGURE 4 it will be seen that the lower left edge of cam driver 39 engages the cam surface 36 below the axis of the drive shaft 40. Thus the force of any fluid pressure in port 18 tending to open the closure member 22 will tend to force the cam driver 39 to rotate counterclockwise. However, it will be seen that such counterclockwise rotation is prevented in a positive manner by abutment of the upper edge of cam driver 39 against the cam surface 38.

Figure 5:
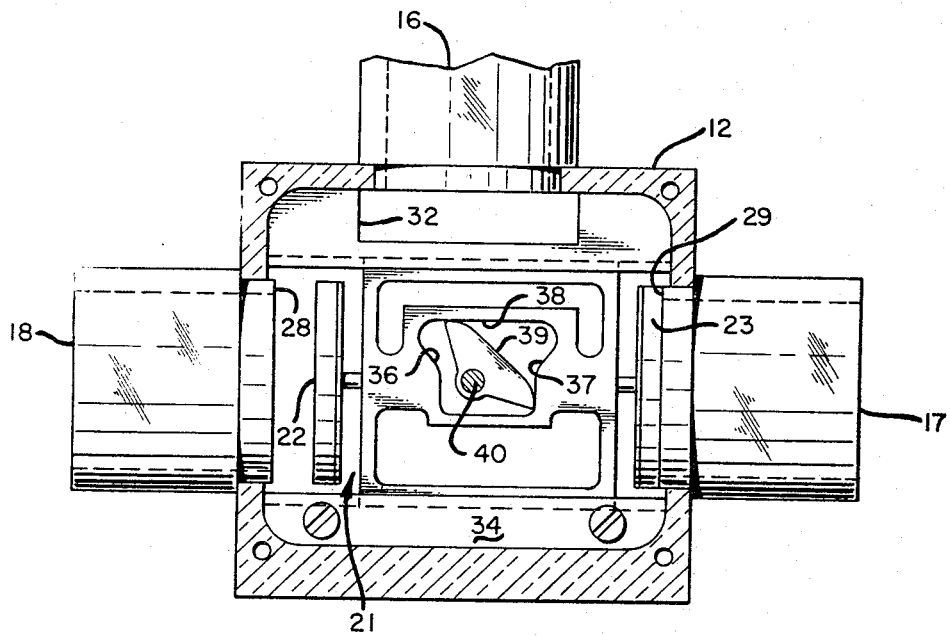
FIGURE 5 is a cross sectional view similar to FIGURE 4 but showing the other of the two opposite ports closed.

When it is desired to change from the condition shown in FIGURE 4 to the condition shown in FIGURE 5, the electric drive mechanism is operated to turn the shaft 40 clockwise as viewed in FIGS. 4 and 5. Such clockwise rotation will cause the left end of cam driver 39 to move upwardly against the cam surface 36 and the right end of cam driver 39 to move downwardly against the cam surface 37. It will be seen that the surfaces 36 and 37 are substantially sloped from vertical adjacent their upper ends and are more nearly vertical adjacent their lower ends. As a result, the initial clockwise movement of the cam driver 39 will cause the valve member 21 to move quickly to the right as the right end of the driver moves downwardly along the sharply sloping portion of surface 37. Then as the right end of driver 39 engages the substantially vertical portion of surface 37 the valve member will move more slowly into final closed position, but substantially more force will be exerted to close the valve. When the valve member is moved fully to the right to close port 17 it will be noted from FIGURE 5 that the right edge of cam driver 39 engages the cam surface 37 at a point below the axis of the cam drive shaft 40, and that the upper edge of the driver engages the cam surface 39 so that the valve member is locked in closed position. Thus, fluid pressure in port 17 acting against the closure element 23 will be unable to move the valve member to the left as viewed in FIGURE 5. Such axial movement of the valve member to the left can be accomplished only when the electric drive mechanism 8 is energized to rotate shaft 40 counterclockwise.

Although specific details of the present invention are shown and described herein, it is to be understood that modifications may be made therein without departing from the spirit and scope of the invention as set forth in the appended claim.

Having thus described the invention what is claimed as new and desired to be secured by Letters Patent is as follows:

1. A valve comprising a casing forming a chamber therein, said valve having three ports in communication with said chamber, two of said ports being positioned opposite each other, a valve member positioned between said opposite ports, guide means supporting said valve member for linear movement between said opposite ports, closure elements on opposite sides of said valve member for closing the one of said opposite ports toward which said valve member is moved, said valve member having a hollow center portion with the inside wall thereof forming a cam surface, a cam driver rotatably supported in engagement with said cam surface for forcing said valve member toward either of said opposite ports, said cam surface comprising two opposite side portions each sloping toward and away from the adjacent one of said opposite ports, said cam surface further comprising an intermediate portion connecting the side portions at the ends of the side portions which slope toward their adjacent ports, said cam driver being arranged to engage one of said side portions and said intermediate portions when said valve member is moved to close one of said ports, and said engagement between the cam driver and said side portion being on the opposite side of the axis of rotation of said cam driver from said intermediate portion when said valve member is positioned to close one of said opposite ports.

References Cited

UNITED STATES PATENTS

| 1,228,453 | 6/1917 | Lehnert | 137—625.5 X |
| 2,738,450 | 3/1956 | Matthews | 251—138 X |
| 3,134,569 | 5/1964 | Sidenbender et al. | 251—259 X |
| 3,219,312 | 11/1965 | Koehler et al. | 251—259 X |

FOREIGN PATENTS

| 1,053,060 | 9/1953 | France. |
| 592,607 | 9/1947 | Great Britain. |
| 211,710 | 1/1941 | Switzerland. |

M. CARY NELSON, *Primary Examiner.*

MICHAEL O. STURM, E. K. FEIN,

*Assistant Examiners.*